United States Patent [19]

Cohen

[11] 4,049,044

[45] Sept. 20, 1977

[54] HEATING AND COOLING SYSTEM CONSUMPTION METER

[76] Inventor: David J. Cohen, 9614 N. Crawford Ave., Skokie, Ill. 60076

[21] Appl. No.: 653,224

[22] Filed: Jan. 28, 1976

[51] Int. Cl.² .............................................. F28F 0/00
[52] U.S. Cl. .................................... 165/11; 62/126; 73/193 R; 236/94
[58] Field of Search .................... 165/11; 62/125, 126; 236/94; 73/193 R; 340/150, 205, 417; 219/487, 497, 506; 222/146; 324/142

[56] References Cited

U.S. PATENT DOCUMENTS

| | | | |
|---|---|---|---|
| 1,903,717 | 4/1933 | Lange | 73/193 R |
| 1,948,234 | 2/1934 | Johnson | 73/193 R |
| 2,210,082 | 8/1940 | Johnson | 73/193 R |
| 2,359,767 | 10/1944 | Keinath | 73/193 R |
| 3,593,578 | 7/1971 | Farrell | 73/193 R |
| 3,995,686 | 12/1976 | Laube | 165/11 |

Primary Examiner—William E. Wayner
Assistant Examiner—Robert Charvat
Attorney, Agent, or Firm—Irving Faber

[57] ABSTRACT

This invention relates to a new and useful device for monitoring the heating and cooling energy consumed by a single unit of a multi-unit apartment or office building. The monitoring circuit is responsive to a thermostat located in each unit as well as the speed of a blower; said blower being used to force the heated or cooled air into the unit. The monitoring circuit is comprised of an integrating circuit coupled to the thermostat and/or fan speed circuit. A pulse generator is electrically coupled to the integrating circuit; the pulse generator generates a pulse after a predetermined amount of current flows into the integrating circuit. The extended pulse is then transmitted to amplifier means which in turn transmits said signal to a pulse counter.

15 Claims, 3 Drawing Figures

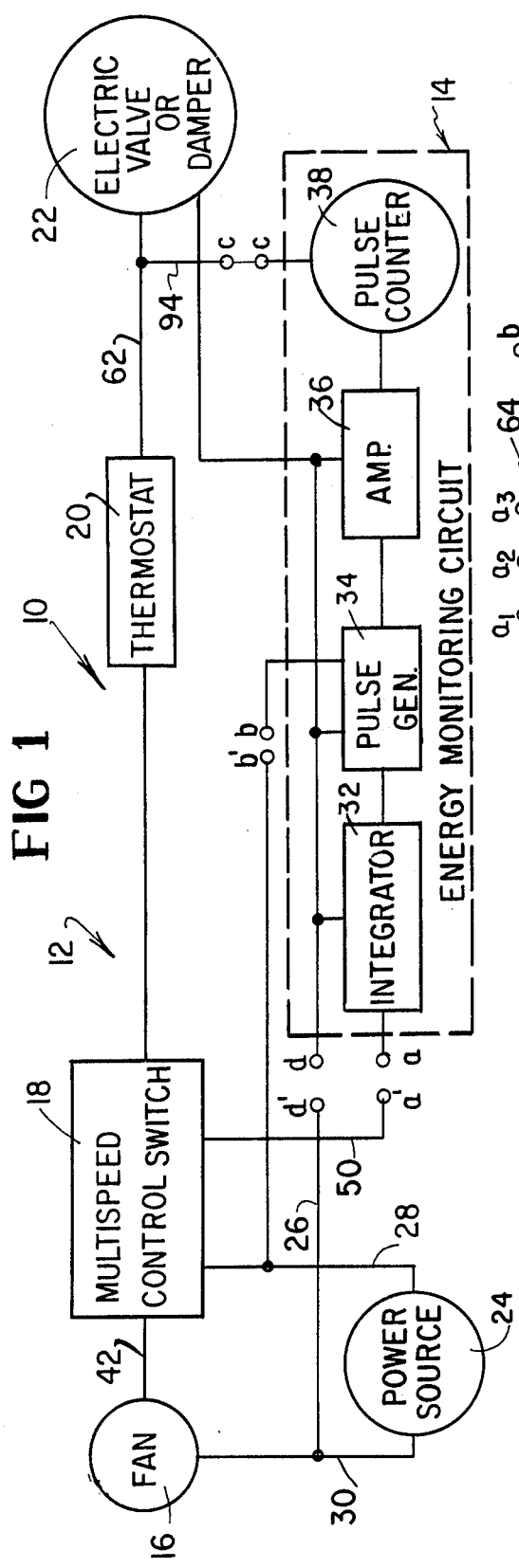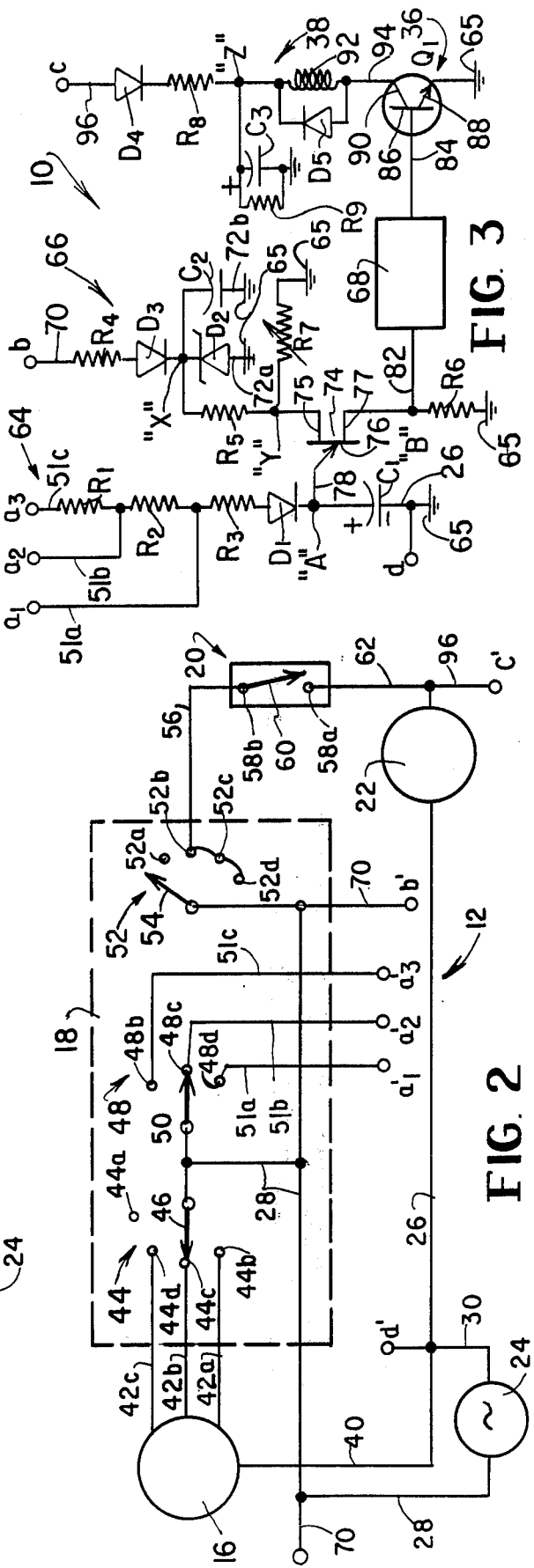

HEATING AND COOLING SYSTEM CONSUMPTION METER

BACKGROUND OF INVENTION

Today there exists many multi-heat apartment and office buildings which have a central heating and/or air conditioning system. In these multi-unit buildings, the owner thereof pays the expense of providing heating and/or air conditioning to the individual units. The basic central heating and air conditioning systems are controlled by a thermostat. The thermostat, located in a unit of the multi-unit building, may in turn control a blower, a valve or a damper also located in the unit. The central system will distribute either hot and/or cold air or liquid to each unit. The blower, located in the unit in either the air or liquid central system, will distribute the heated or cooled air into the unit as demanded by the thermostat.

When a valve or damper is controlled by the thermostat, either is driven to its fully opened or closed positions upon an appropriate signal from the thermostat or it may be driven to several intermediate positions in response to the thermostat.

Central heating and air conditioning systems are the most efficient means for heating and cooling multi-occupant buildings. However, a problem does occur when a multi-unit building is converted to condominium units. The basic problem with the central unit when converting an existing multi-unit building to a condominium, or in fact, building a new condominium unit, is how to monitor the energy proportionally consumed by each unit and to distribute the cost of operating the central heating and/or cooling system proportionally between the various units. The customary means for allocating heating and cooling cost in the multi-unit buildings is to take the total cost and divide it between all of the units. This method is obviously unfair in that an occupant of a unit is paying for heating and/or cooling they are not using when they are away. Also, some occupants require more het and cooling capacity than others. Recent studies by the Federal Government indicate that when occupants are individually metered with regard to their energy consumption, rather than equally billed, a significant reduction in energy consumption results. Without metering, an occupant may go on vacation and leave his air conditioning or heating running. However, if the occupant is aware that he is being charged for the energy consumed in his unit, he will turn down the thermostat to a minimum level when he leaves.

To the best knowledge of applicant there are no known devices for use to accurately and economically monitor the heating and/or cooling energy consumed by an individual unit in a multi-unit building.

The device that I have invented will effectively and efficiently monitor the amount of heating and/or cooling energy consumed by each unit in a multi-unit building enabling one to efficiently and economically ascertain their fair cost for said energy with an additional overall effect of energy conservation.

SUMMARY OF THE INVENTION

This invention relates to a new and useful device for accurately, economically, and efficiently determining the amount of heating and/or cooling energy consumed by an occupant of a multi-unit building having a central heating and/or air conditioning system in proportion to the total energy consumed by the whole building. A typical central heating/air conditioning system consists of a fan coil in each unit of the building through which pass pipes which run throughout the building. These pipes carry either hot water for heating or cold water for air-conditioning. A blower fan adjacent the fan coil forces air through the fan coil to extract the energy therefrom and distribute same to the unit of the building. The device is attached to the heating and/or air conditioning controls in each unit of the building that is connected with the central heating and air conditioning system. The device, once connected to the controls in each unit, will monitor the total amount of energy consumed by the tenant in proportion to the total energy consumed by the entire building; thereby enabling one to ascertain the cost for energy consumed by them.

The device for monitoring the energy consumption of a unit of a multi-unit building incorporating a thermostat and a variable speed fan comprises integrating means that are connected to a fan speed switch and responsive to fan speed. The closed thermostat contacts indicate a need for either heat or air conditioning. The integrating means are coupled to pulse generating means which is responsive to the amplitude of the integrated signal. The pulses from the pulse generating means is fed to amplifier means which in turn is coupled to an electromechanical solenoid operated digital counter or directly to an electronic digital counter. In the latter instance, the amplifier means are unnecessary. The counter cannot operate when the thermostat contacts are open.

It is well known that better temperature regulation is achieved when a variable speed blower fan having two or more speed adjustments is used. The amount of energy consumed by each unit will increase proportionally to the increase in fan speed. Additional temperature regulation is also obtained by selectively opening and closing a damper in various sections of the units in response to the thermostat. Hence, the thermostat may control the valve only, the valve and damper, or the damper only. In some systems where the damper is controlled, the blower fan speed remains constant and is not varied. The energy monitoring device incorporated by this invention is directly responsive not only to the thermostat but to the speed of the fan motor. The intput signal to the integrating means is increased as the fan speed is increased.

Accordingly, it is an object of this invention to provide an apparatus for efficiently, economically and effectively monitoring the heating and cooling energy consumed in a unit of a multi-unit building.

Another object of the invention is to provide an apparatus that will monitor the heating and cooling energy consumed, in a unit of a multi-unit building based upon a thermostat located in the unit, in proportion to the amount of energy consumed by the whole building.

IN THE DRAWINGS

FIG. 1 illustrates, in block diagram form, a typical control and energy monitoring circuit embodied by this invention.

FIG. 2 is a circuit diagram of a typical switching or control circuit embodied by this invention.

FIG. 3 is a circuit diagram of the energy monitoring circuit embodied by this invention.

DESCRIPTION OF PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

FIG. 1 illustrates, in block diagram form, a circuit 10 embodied by the invention. The circuit 10 is comprised of a switching circuit 12 and an energy monitoring circuit 14.

The switching circuit 12 is comprised of a blower fan 16 having a multi-speed control switch 18, a thermostat 20, a valve or damper 22 and a power source 24. The thermostat 20 is positioned within the building unit and is electrically coupled to the speed control switch 18. The electric valve or damper 22 is electrically coupled to the thermostat 20 and to an electrically grounded common line 26. The speed control switch 18 controls the fan 16 enabling it to force the heated or cooled air into the unit. The power source 24 being a common 110 volt a.c. source, has one line thereof 28 coupled to the speed control switch 18 and a second line 30 coupled to the common ground line 26.

The energy monitoring circuit 14 monitors the amount of heating and/or cooling energy used in a particular unit and is coupled to the switching circuit 12 at points $a-a'$, $b-b'$, $c-c'$ and $d-d'$; these points being electrically connected together. The energy monitoring circuit 14 comprises an integrator 32, a pulse generator 34, an amplifier 36 and a pulse counter 38. The integrator 32 is electrically coupled to the switch 18 and to the pulse generator 34 which in turn is electrically coupled to the amplifier 36. The pulse counter 38 is electrically coupled to the amplifier 36. The common ground line 26 is electrically coupled to the integrator 32, the pulse generator 34, and the amplifier 36.

FIG. 2 is a circuit diagram of the switching circuit 12. As illustrated in FIG. 2, the fan motor 16 has a lead 40 connected to the common line 26 and three leads 42a, 42b, 42c connected to a selector switch 44 having four contacts 44a, 44b, 44c and 44d of the switch 18; contact points 44a through 44d represent off, low, medium, and high positions respectively of the fan motor speed. A selector arm 46 of switch 44 is electrically coupled to the power source 24 via lead 28. A second selector switch 48 having a set of contacts 48b, 48c and 48d representing low, medium and high speed positions respectively for the fan motor 16 and a selector arm 50 is positioned within the control switch 18. The selector arm 50, as is the selector arm 46, is electrically coupled to the power source 24 via lead 28 thereby forming a parallel electrical connection between the contacts 44b through 44d and contacts 48b through 48d with the "off" contact 44a being common to each of said sets of contacts.

There are three leads 51a, 51b and 51c coupled to the contacts 48d, 48c, and 48b respectively and to the integrator circuit 32 at points $a'_1$, $a'_2$, and $a'_3$.

Another selector switch 52 having a set of contacts 52a, 52b, 52c, and 52d are positioned within the control switch circuit 18 having a selector arm 54 electrically coupled in parallel to the selector arms 46 and 50. The contacts 52a through 52d represents positions of off, low, medium, and high, said contacts being electrically connected by means of lead 56. The selector switches 44, 48, and 52 are of a type well known in the art that enable electrical energy to flow via the selector arm to whatever contact said selector arm is positioned on.

The selector switch 44 is an example of one of a plurality of variable speed means for controlling the blower fan 16. A further example of such variable speed means would be a potentiometer or an SCR device. There are many variable speed devices other than the selector switch 44 that can be used for controlling the speed of the blower 16 without deviating from the spirit and scope of the invention.

The thermostat 20 is of a type well known in the art having contacts 58a and 58b. The thermostat 20 has an element, not shown, that is responsive to a specific temperature setting. When the temperature in a unit reaches the temperature setting demanding energy to flow to the electric valve or damper 22, the theremostat element enables a contact arm 60 that is electrically coupled to contact 58b to electrically engage contact 58a thereby completing an electrical circuit to said electric valve or damper 22 via a lead 62.

FIG. 3 is a circuit diagram of the energy monitoring circuit 14 embodied by this invention. The integrator circuit 32 is coupled to the switching circuit 12 via leads 51a, 51b, and 51c at points $a_1$, $a_2$, and $a_3$ and comprises a capacitor charging network 64 having series connected timing resistors $R_1$, $R_2$, $R_3$ which in turn are electrically coupled to a diode $D_1$. A capacitor $C_1$ is coupled to the cathode of diode $D_1$ and to an electrical ground point 65 via the common line 26. The charging time is proportional to the $RC_1$ product. At low fan speed $R = R_1 + R_2 + R_3$ and at high fan speed $R = R_3$. Therefore, at a high fan speed, the charging rate is greater than at low fan speed. The timing resistors $R_1$, $R_2$ and $R_3$ may be electrically connected in parallel or in any other electrical combination in lieu of being connected in series.

The pulse generator 34 is comprised of a level detector circuit 66 and a wave shaper 68. The level detector circuit 66 is electrically coupled to the power source 24 by means of line 70 at point "$b-b'$" and to the ground point 65 and comprises a resistor $R_4$ having one end electrically connected to line 70 and the other end series connected to diode $D_3$ which in turn is electrically coupled in parallel to a Zener diode $D_2$ and a capacitor $C_2$. The Zener diode $D_2$ and capacitor $C_2$ are electrically tied to ground point 65 via leads 72a and 72b respectively. The juncture of the Zener diode $D_2$, diode $D_3$ and capacitor $C_2$ is designated by the letter "X." One end of a resistor $R_5$ is electrically coupled to the juncture "X" while the other end is electrically coupled to one end of a variable resistor $R_7$ and to a unijunction transistor (UJT) 74 by means of its base-two 75. The other end of resistor $R_7$ is electrically connected to the common ground point 65. The juncture of resistors $R_5$ and $R_7$ with the base-two 75 of the unijunction transistor 74 is designated by the letter "Y." The UJT 74 has an emitter 76 that is electrically connected to the integrator circuit 32 by means of line 78 at the juncture of the diode $D_1$ and the capacitor $C_1$; said juncture being designated by the letter "A." A resistor $R_6$ has one end thereto electrically coupled to the base-one of UJT 74 and its other end electrically coupled to the common ground point 65.

The wave shaper 68 is a monostable multivibrator well known in the art and is readily available in the market and therefore I have chosen not to illustrate its circuitry. The monostable multivibrator has its input lead 82 electrically coupled to the output of level detector 66 at the juncture of $R_6$ and the base-one 77 of the UJT 74; said juncture being designated by the letter "B." The output lead 84 of the wave shaper 68 is coupled to amplifier 36. The amplifier 36 is comprised of an amplifier transistor $Q_1$ having its base 86 coupled to the output lead 84 of the wave shaper 68 and its emitter 88 electrically coupled to ground point 65. The collector 90 of the transistor $Q_1$ is electrically coupled to one end of a counter solenoid coil 92 and diode $D_5$ of the counter 38. the diode $D_5$ and coil 92 being electrically connected in parallel by means of lead 94. The other end of the counter solenoid coil 92 and diode $D_5$ are electrically coupled to the thermostat 20 by means of line 96 via diode $D_4$ and resistor $R_8$. A capacitor $C_3$ and resistor $R_9$ are electrically connected in parallel to the resistor $R_8$ and the solenoid coil 92 and diode $D_5$. The juncture of $R_8$, $R_9$, $C_3$, $D_5$ and the coil 92 is designated by the letter "Z."

It is understood that the amplifier $Q_1$ would not be required if an electronic pulse counter were to be used in lieu of a digital counter illustrated in the drawings. The pulse counter 38, be it mechanical or electronic, is well known in the art and is readily available in the market.

In operation the capacitor $C_1$ charges at a time constant $RC_1$ and when its voltage reaches a particular DC voltage that is proportional to the DC voltage at juncture "Y," the UJT 74 rapidly discharges said DC voltage at emitter 76 through resistor $R_6$. The voltage pulse developed across $R_6$ is very short in duration, approximately 10 microseconds, and is of a uniform amplitude of about 3 volts. This short pulse is fed into the monostable multivibrator 68 where its duration is extended from approximately 10 microseconds to about 100 milliseconds. It is this larger pulse duration that is required to operate the solenoid coil 92 of the counter 38 via the amplifier transistor $Q_1$, which becomes conductive for the duration of each pulse fed into its base 86. It is at this time, conductivity of the amplifier $Q_1$, that the solenoid coil 92 of pulse counter 38 becomes energized from the DC voltage present at junction "Z" if the thermostat 20 is in its closed position. If the contact of thermostat 20 is open, the pulse counter cannot become energized, even if the blower fan is running.

Each pulse fed to the solenoid coil 92 and diode $D_5$ of the counter 38 causes a digital indicator, not shown, to be advanced by a solenoid plunger, not shown, which thereby provides a digital readout corresponding to the status of the thermostat 20 and the blower fan speed in a unit associated with the central heating and/or air conditioning system.

The circuitry for the monitoring circuit 14 can be positioned in a standard electrical junction box, not shown, which in turn is coupled to the existing thermostat/blower switch circuit 12 located in each unit of the building.

It is understood that a tachometer, not shown, but coupled to the blower motor will generate a series of pulses at a frequency proportional to fan speed and may be used in lieu of the integrating circuit 32 and level detector circuit 66 without departing from the spirit and scope of this invention.

Attention is brought to the fact that in many commercial and industrial heating and/or cooling systems additional and more precise temperature control is attained by modulating the solenoid valve or damper or both. The amount and direction of air flow is then also a function of damper position as well as blower speed. In such case, for the additional temperature control, the solenoid valve and/or damper 22 might open in varying degrees rather than just two or three positions.

The circuit 10 described herein defines means for translating energy used by a unit as a function of any one or combination of, blower speed and thermostat. A means for translating a variable damper and/or valve position or other energy regulating means for the heating and/or cooling system would be a potentiometer, not shown, coupled to the pivoting member of the damper or to the stem of the valve. The potentiometer would cause the pulse rate of the pulse generator 34 to vary porportionally thereto. This potentiometer could be connected in series with variable resistor $R_7$ in FIG. 3. The thermostat need not be directly monitored when valve or damper position is monitored. In this situation, the crucial factor relating to consumed energy is position of the damper and/or valve and not the specific position of the thermostat.

It is understood that the electrical components illustrated in the figures and their relationship to each other may vary in value depending on whether blower speed, air damper position or both are variables. I have found that the following values for the parimeters illustrated in the drawings are suitable for achieving a monitoring system capable of measuring the energy, heating or cooling used by a single unit of a multi-unit building in proportion to the total energy consumed by the multi-unit building:

| | |
|---|---|
| $R_1$ = 1 megohm | $C_1$ = 75 micro farads |
| $R_2$ = .750 megohm | $C_2$ = 100 micro farads |
| $R_3$ = 1.50 megohm | $C_3$ = 25 micro farads |
| $R_4$ = 2,000 ohms | |
| $R_5$ = 470 ohms | $D_2$ = Zener diode |
| $R_6$ = 47 ohms | with 20 volt |
| $R_7$ = 2,000 ohms (variable) | breakdown voltage |
| $R_8$ = 2,000 ohms | $D_1$, $D_3$, $D_4$, $D_5$ are standard |
| $R_9$ = 1,000 ohms | circuit diodes |

It is further understood that the values and circuit configuration hereinabove set forth and illustrated in the drawings may vary without deviating from the spirit and scope of the invention.

It is believed that the invention has been described in such detail as to enable those skilled in the art to understand the same and it will be appreciated that variations may be made without departing from the spirit and scope of the invention.

What is desired to be secured by letters patent in the United States is:

1. A device for monitoring the heating and cooling energy consumed by a single unit of a multi-unit building, in proportion to the total energy consumed by said multi-unit building, said device comprising in combination:
    a control circuit for controlling the speed of a blower fan, said blower fan being used to force heated and cooled air into the single unit;
    an energy monitoring circuit for monitoring the amount of heating and cooling energy used in a unit, said circuit being electrically coupled to said control circuit, said energy monitoring circuit having an integrating circuit, a pluse generator, and a pulse counter;
    wherein said integrating circuit is electrically coupled to the pulse generator and the pulse generator is electrically coupled to the pulse counter.

2. A device for monitoring the heating and cooling energy consumed by a single unit of a multi-unit building as defined in claim 1, wherein said integrator circuit comprises:
a capacitor charging network, said charging network being electrically coupled to the control circuit.

3. A device for monitoring the heating and cooling energy consumed by a single unit of a multi-unit building as defined in claim 2, wherein said pulse generator comprises:
a level detector circuit; said detector circuit being electrically coupled to the integrating circuit to discharge the capacitor of said charging network when the voltage thereacross reaches a predetermined level; and
a wave shaper electrically coupled to said level detector and to said pulse amplifier.

4. A device for monitoring the heating and cooling energy consumed by a single unit of a multi-unit building as defined in claim 3, wherein said capacitor charging network comprises:
a timing resistor electrically coupled to a source of rectified current;
a capacitor being electrically coupled, in series, to the timing resistor and to an electrical ground point;
wherein the charging time of said capacitor is proportional to the product of the values of the timing resistor and the capacitor.

5. A device for monitoring the heating and cooling energy consumed by a single unit of a multi-unit building as defined in claim 4 wherein said energy monitoring circuit further comprises:
an amplifier electrically coupled to the pulse generator and to the pulse counter.

6. A device for monitoring the heating and cooling energy consumed by a single unit of a multi-unit building as defined in claim 4 wherein the wave shaper of the pulse generator is a monostable multivibrator.

7. A device for monitoring the heating and cooling energy consumed by a single unit of a multi-unit building as defined in claim 4 wherein said control circuit comprises:
a power source
said blower fan being electrically coupled to said power source; and
thermostat switch means electrically coupled to said power source.

8. A device for monitoring the heating and cooling energy consumed by a single unit of a multi-unit building as defined in claim 7 wherein said thermostat switch means is electrically coupled to said pulse counter.

9. A device for monitoring the heating and cooling energy consumed by a single unit of a multi-unit building as defined in claim 4 wherein said control circuit comprises:
a power source;
thermostat switch means electrically coupled to said power source; and
energy regulating means electrically coupled to the thermostat.

10. A device for monitoring the heating and cooling energy consumed by a single unit of a multi-unit building as defined in claim 9 wherein the pulse counter is electrically coupled to said thermostat and to said energy regulating means.

11. A device for monitoring the heating and cooling energy consumed by a single unit of a multi-unit building as defined in claim 10 wherein said energy regulating means comprises a damper for controlling the flow of air into a unit.

12. A device for monitoring the heating and cooling energy consumed by a single unit of a multi-unit building as defined in claim 10 wherein said energy regulating means comprises:
an electric valve for controlling the flow of liquid into a unit.

13. A device for monitoring the heating and cooling energy consumed by a single unit of a multi-unit building as defined in claim 10 wherein said control circuit further comprises:
a blower fan electrically coupled to the power source.

14. A device for monitoring the heating and cooling energy consumed by a single unit of a multi-unit building as defined in claim 8 wherein said control circuit further comprises:
a variable speed control switch means electrically coupled to said blower fan and to the timing resistor of the charging network of said integrator.

15. A device for monitoring the heating and cooling energy consumed by a single unit of a multi-unit building as defined in claim 14 wherein said variable speed control switch means comprises a selector switch for controlling the speed of the blower fan.

* * * * *

UNITED STATES PATENT AND TRADEMARK OFFICE
CERTIFICATE OF CORRECTION

PATENT NO. : 4,049,044
DATED : September 20, 1977
INVENTOR(S) : DAVID J. COHEN

It is certified that error appears in the above-identified patent and that said Letters Patent are hereby corrected as shown below:

Column 1, line 41, "het" should be --heat--

Column 2, line 47, "intput" should be --input--

Column 7, lines 28-33, "Claim 5" should be --Claim 14--

Column 7, lines 34-37, "Claim 6" should be --Claim 15--

Column 7, lines 38-46, "Claim 7" should be --Claim 5--

Column 8, lines 1-4, "Claim 8" should be --Claim 6-- and "as defined in claim 7" should be --as defined in claim 5--

Column 8, lines 35-41, "Claim 14" should be --Claim 7-- and "as defined in claim 8" should be --as defined in claim 6--

UNITED STATES PATENT AND TRADEMARK OFFICE
CERTIFICATE OF CORRECTION

PATENT NO. : 4,049,044
DATED : September 20, 1977
INVENTOR(S) : DAVID J. COHEN

It is certified that error appears in the above-identified patent and that said Letters Patent are hereby corrected as shown below:

Column 8, lines 42-46, "Claim 15" should be --Claim 8-- and "as defined in claim 14" should be --as defined in claim 7--

Signed and Sealed this

Fourteenth Day of March 1978

[SEAL]

Attest:

RUTH C. MASON
Attesting Officer

LUTRELLE F. PARKER
Acting Commissioner of Patents and Trademarks